US008960274B2

(12) United States Patent
Vanderford et al.

(10) Patent No.: US 8,960,274 B2
(45) Date of Patent: Feb. 24, 2015

(54) WELLHEAD TUBULAR CONNECTOR

(71) Applicant: Cameron International Corporation, Houston, TX (US)

(72) Inventors: Delbert Edwin Vanderford, Cypress, TX (US); Kenneth Melvin Reed, Humble, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 13/736,934

(22) Filed: Jan. 8, 2013

(65) Prior Publication Data

US 2013/0186614 A1  Jul. 25, 2013

Related U.S. Application Data

(63) Continuation of application No. 12/622,394, filed on Nov. 19, 2009, now Pat. No. 8,347,970.

(60) Provisional application No. 61/255,081, filed on Oct. 26, 2009.

(51) Int. Cl.
*E21B 19/00* (2006.01)
*E21B 17/02* (2006.01)
*E21B 33/03* (2006.01)
*E21B 33/04* (2006.01)
*F16L 25/06* (2006.01)

(52) U.S. Cl.
CPC ............... *E21B 17/02* (2013.01); *E21B 33/03* (2013.01); *E21B 33/04* (2013.01); *F16L 25/065* (2013.01)
USPC ....................... 166/75.14; 166/382

(58) Field of Classification Search
USPC .................. 166/382, 75.14, 379
See application file for complete search history.

(56) References Cited

U.S. PATENT DOCUMENTS

| 3,405,956 | A |   | 10/1968 | Pierce |           |
|-----------|---|---|---------|--------|-----------|
| 3,902,743 | A |   | 9/1975  | Martin |           |
| 4,646,827 | A | * | 3/1987  | Cobb   | 166/88.2  |

(Continued)

FOREIGN PATENT DOCUMENTS

GB             163028        3/1922

OTHER PUBLICATIONS

PCT International Search Report & Written Opinion for PCT Application No. PCT/US2010/049492; dated Apr. 21, 2011.

(Continued)

*Primary Examiner* — Brad Harcourt
(74) *Attorney, Agent, or Firm* — Fletcher Yoder P.C.

(57) ABSTRACT

Systems and methods are provided that may include employing a lockscrew to provide radial and axial force in connecting tubular members in a mineral extraction system. The lockscrew may be angled relative to the tubular members, at an angle that is greater than 0 degrees and less than 90 degrees. Further, the lockscrew may have an end portion which mates with a slot in a locking segment, and the lockscrew and locking segment may be moved from an unlocked to a locked position. In a locked position, the lockscrew exerts force axially downward and radially inward to push the locking segment against a tubular member, locking the member in place. The interconnection between the lockscrew and the locking segment may enable easier installation and may utilize parts which may be easier to manufacture. Furthermore, the angle of the lockscrew may provide improved support for tubular members.

32 Claims, 10 Drawing Sheets

(56) References Cited

U.S. PATENT DOCUMENTS

| | | | |
|---|---|---|---|
| 4,650,226 A * | 3/1987 | Babbitt et al. | 285/348 |
| 5,002,131 A | 3/1991 | Cromar et al. | |
| 5,515,926 A * | 5/1996 | Boychuk | 166/379 |
| 5,522,464 A | 6/1996 | Piper | |
| 2009/0090508 A1 | 4/2009 | Brouse | |

OTHER PUBLICATIONS

GB Examination Report; Application No. GB1204428.5; Dated Jul. 28, 2014; 3 pages.

GB Examination Report; Application No. GB1411993.7; Dated Jul. 28, 2014; 5 pages.

GB Examination Report; Application No. GB1411994.5; Dated Jul. 28, 2014; 5 pages.

* cited by examiner

WELLHEAD TUBULAR CONNECTOR

CROSS REFERENCE TO RELATED APPLICATIONS

This application claims priority to U.S. patent application Ser. No. 12/622,394, entitled "Wellhead Tubular Connector", filed on Nov. 19, 2009, which is herein incorporated by reference in its entirety, which claims priority to U.S. Provisional Patent Application No. 61/255,081, entitled "Wellhead Tubular Connector", filed on Oct. 26, 2009, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity, in addition to a myriad of other uses. Once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components and/or conduits, such as casings, trees, manifolds, and so forth, which facilitate drilling and/or extraction operations. A long pipe, such as a casing, may be lowered into the earth and/or submerged under water to enable access to the natural resource. Additional pipes and/or tubes may then be run through the casing to facilitate extraction of the resource.

The components and/or conduits of the wellhead assembly are joined and sealed by locking mechanisms to provide a flow path for fluids during extraction. However, because such locking mechanisms typically involve using additional parts and tools to lock or unlock different wellhead components, the installation, repair, and/or replacement of components may be time consuming and complicated, especially for subsea wellhead assemblies. Furthermore, typical locking mechanisms may sometimes be insufficient for the tension and pressure loads on the wellhead assembly.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
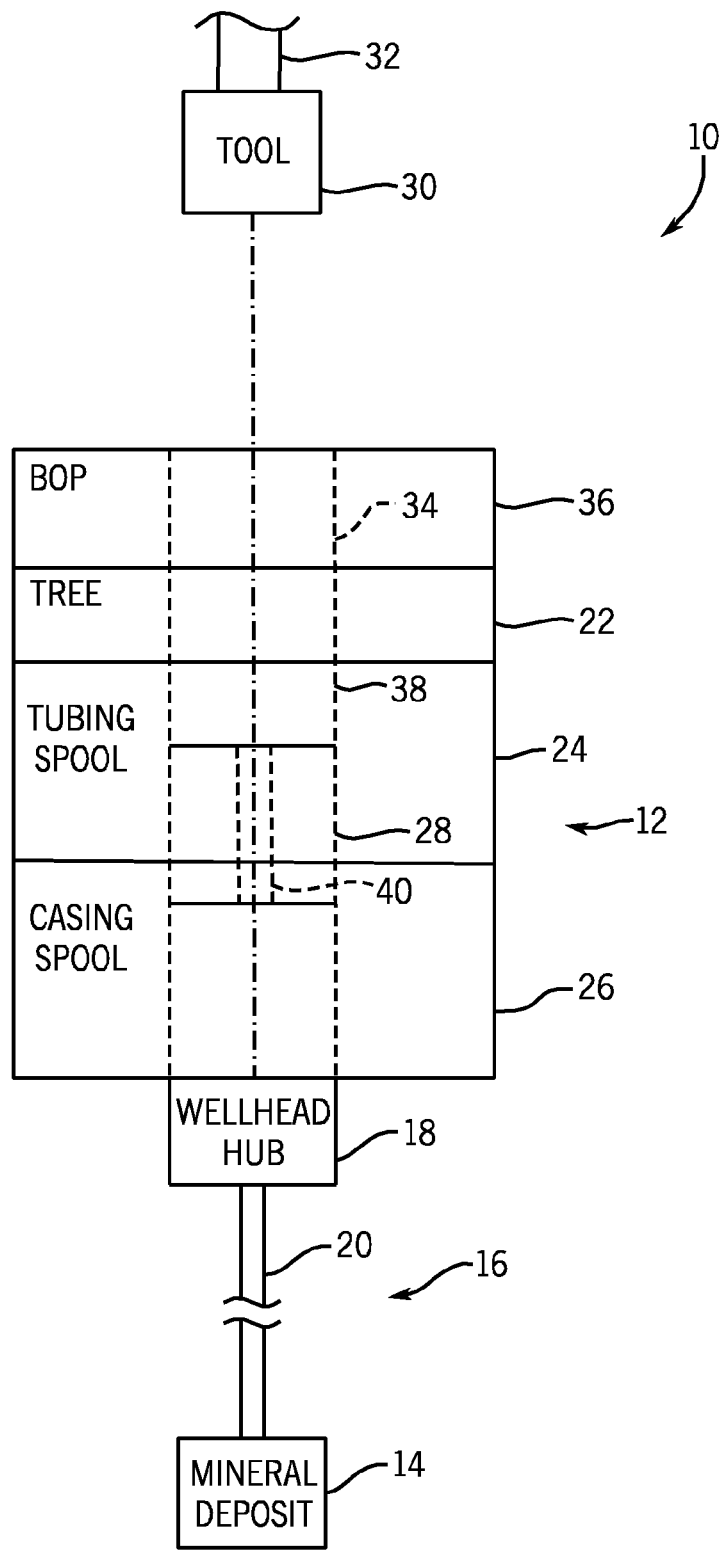
FIG. 1 is a block diagram illustrating a mineral extraction system in accordance with an embodiment of the present techniques.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Embodiments of the present techniques include systems and methods for connecting tubular members in a mineral extraction system. In particular, in some embodiments, one or more lockscrews and locking segments may interlock to hold a first tubular member (e.g., a tubing spool or casing spool) relative to a second tubular member. For example, each lockscrew may have a boss member, which may be configured to mate with a slot of a respective locking segment. Each lockscrew and locking segment may fit within the first tubular member (e.g., tubing spool) in the mineral extraction system. Due to the interface between the lockscrew and the locking segment, the lockscrew and locking segment may be retained in the first tubular member in an unlocked position. For example, the lockscrew may be rotated in a first rotational direction to move the lockscrew along its axis in a first linear direction to drive the locking segment toward the unlocked position, wherein the locking segment is disposed in a radial recess in the first tubular member in the unlocked position. Subsequently, the first tubular member may be positioned over the second tubular member while the locking segment is disposed in radial recess in the unlocked position, such that the locking segment does not interfere with movement of the second tubular member axially into the first tubular member. In turn, the lockscrew may be rotated in a second rotational direction (e.g., opposite from the first rotational direction) to move the lockscrew along its axis in a second linear direction (e.g., opposite from the first linear direction) to drive the locking segment away from the unlocked position toward a locked position, wherein the locking segment protrudes out of the radial recess in the first tubular member in the locked position. In the locked position, the locking segment radially compresses the second tubular member relative to the first tubular member, thereby securing the first and second tubular members together.

In certain embodiments, the first and second linear directions may be disposed at an acute angle relative to a longitudinal axis of the first and second tubular member. For example, the acute angle may be greater than 0 degrees and less than 90 degrees, e.g., approximately 5 to 60, 10 to 50, 20 to 40, or about 30 degrees. Thus, the angled linear movement of the lockscrew along the first and second linear directions imparts axial and radial movement of the locking segment. As discussed below, each locking segment may include a tapered surface disposed along a mating tapered surface of the respective radial recess, thereby enabling radial inward and outward movement of the locking segment in response to the angled linear movement of the lockscrew along the first and second linear directions. Furthermore, in certain embodiments, the interface between the lockscrew and the locking segment may reduce the number of lockscrews utilized, as only one lockscrew may mate with each locking segment in the system.

FIG. 1 is a block diagram that illustrates an embodiment of a mineral extraction system 10, which may use the unique lockscrew-segment connector system as discussed in further detail below. The illustrated mineral extraction system 10 may be configured to extract various minerals and natural resources, including hydrocarbons (e.g., oil and/or natural gas), from the earth, or to inject substances into the earth. In some embodiments, the mineral extraction system 10 is land-based (e.g., a surface system) or sub-sea (e.g., a sub-sea system). As illustrated, the system 10 includes a wellhead 12 coupled to a mineral deposit 14 via a well 16. The well 16 may include a wellhead hub 18 and a well bore 20. The wellhead hub 18 generally includes a large diameter hub disposed at the termination of the well bore 20 and designed to connect the wellhead 12 to the well 16.

The wellhead 12 may include multiple components that control and regulate activities and conditions associated with the well 16. For example, the wellhead 12 generally includes bodies, valves, and seals that route produced minerals from the mineral deposit 14, regulate pressure in the well 16, and inject chemicals down-hole into the well bore 20. In the illustrated embodiment, the wellhead 12 includes what is colloquially referred to as a Christmas tree 22 (hereinafter, a tree), a tubing spool 24, a casing spool 26, and a hanger 28 (e.g., a tubing hanger and/or a casing hanger). The system 10 may include other devices that are coupled to the wellhead 12, and devices that are used to assemble and control various components of the wellhead 12. For example, in the illustrated embodiment, the system 10 includes a running tool 30 suspended from a drill string 32. In certain embodiments, the running tool 30 includes a running tool that is lowered (e.g., run) from an offshore vessel to the well 16 and/or the wellhead 12. In other embodiments, such as surface systems, the running tool 30 may include a device suspended over and/or lowered into the wellhead 12 via a crane or other supporting device.

The tree 22 generally includes a variety of flow paths (e.g., bores), valves, fittings, and controls for operating the well 16. For instance, the tree 22 may include a frame that is disposed about a tree body, a flow-loop, actuators, and valves. Further, the tree 22 may provide fluid communication with the well 16. For example, the tree 22 includes a tree bore 34. The tree bore 34 provides for completion and workover procedures, such as the insertion of tools into the well 16, the injection of various chemicals into the well 16, and so forth. Further, minerals extracted from the well 16 (e.g., oil and natural gas) may be regulated and routed via the tree 22. For instance, the tree 22 may be coupled to a jumper or a flowline that is tied back to other components, such as a manifold. Accordingly, produced minerals flow from the well 16 to the manifold via the wellhead 12 and/or the tree 22 before being routed to shipping or storage facilities. A blowout preventer (BOP) 36 may also be included, either as a part of the tree 22 or as a separate device. The BOP 36 may consist of a variety of valves, fittings, and controls to prevent oil, gas, or other fluid from exiting the well in the event of an unintentional release of pressure or an overpressure condition.

The tubing spool 24 provides a base for the tree 22. Typically, the tubing spool 24 is one of many components in a modular sub-sea or surface mineral extraction system 10 that is run from an offshore vessel or surface system. The tubing spool 24 includes a tubing spool bore 38. The tubing spool bore 38 connects (e.g., enables fluid communication between) the tree bore 34 and the well 16. Thus, the tubing spool bore 38 may provide access to the well bore 20 for various completion and workover procedures. For example, components can be run down to the wellhead 12 and disposed in the tubing spool bore 38 to seal off the well bore 20, to inject chemicals down-hole, to suspend tools down-hole, to retrieve tools down-hole, and so forth.

The well bore 20 may contain elevated pressures. For example, the well bore 20 may include pressures that exceed 10,000, 15,000, or even 20,000 pounds per square inch (psi). Accordingly, the mineral extraction system 10 may employ various mechanisms, such as seals, plugs, and valves, to control and regulate the well 16. For example, plugs and valves are employed to regulate the flow and pressures of fluids in various bores and channels throughout the mineral extraction system 10. For instance, the illustrated hanger 28 (e.g., tubing hanger or casing hanger) is typically disposed within the wellhead 12 to secure casing suspended in the well bore 20, and to provide a path for hydraulic control fluid, chemical injections, and so forth. The hanger 28 includes a hanger bore 40 that extends through the center of the hanger 28, and that is in fluid communication with the tubing spool bore 38 and the well bore 20. One or more seal assemblies and/or landing assemblies may be disposed between the hanger 28 and the tubing spool 24 and/or the casing spool 26.

One or more tubular connectors (i.e., connectors that couple tubular members) may also be employed to join and seal tubular members in the wellhead 12. For example, screws, pins, or other locking mechanisms may be employed to join and seal the tubing spool 24 to the hanger 28 and/or the hanger 28 to the casing spool 26, etc. Additional pieces or tools may sometimes be used to lock or unlock certain connector systems. However, such connector systems may be complex, and may increase installation time of the wellhead and/or pipe, especially in a sub-sea mineral extraction system 10. Furthermore, some tubular connectors are positioned perpendicularly to the axis of tubular members in the wellhead 12. While such perpendicularly positioned connectors may provide radial support along the axis of the wellhead 12, connectors providing radial support alone may be insufficient for maintaining the juncture of tubular members when the wellhead 12 experiences pressure and tension against its axis, such as strong environmental conditions. Therefore, a tubular connector system which provides additional support (e.g., axial support in addition to radial support), and which can be locked or unlocked without additional pieces, may be beneficial for a variety of mineral extraction applications.

Figure 2:
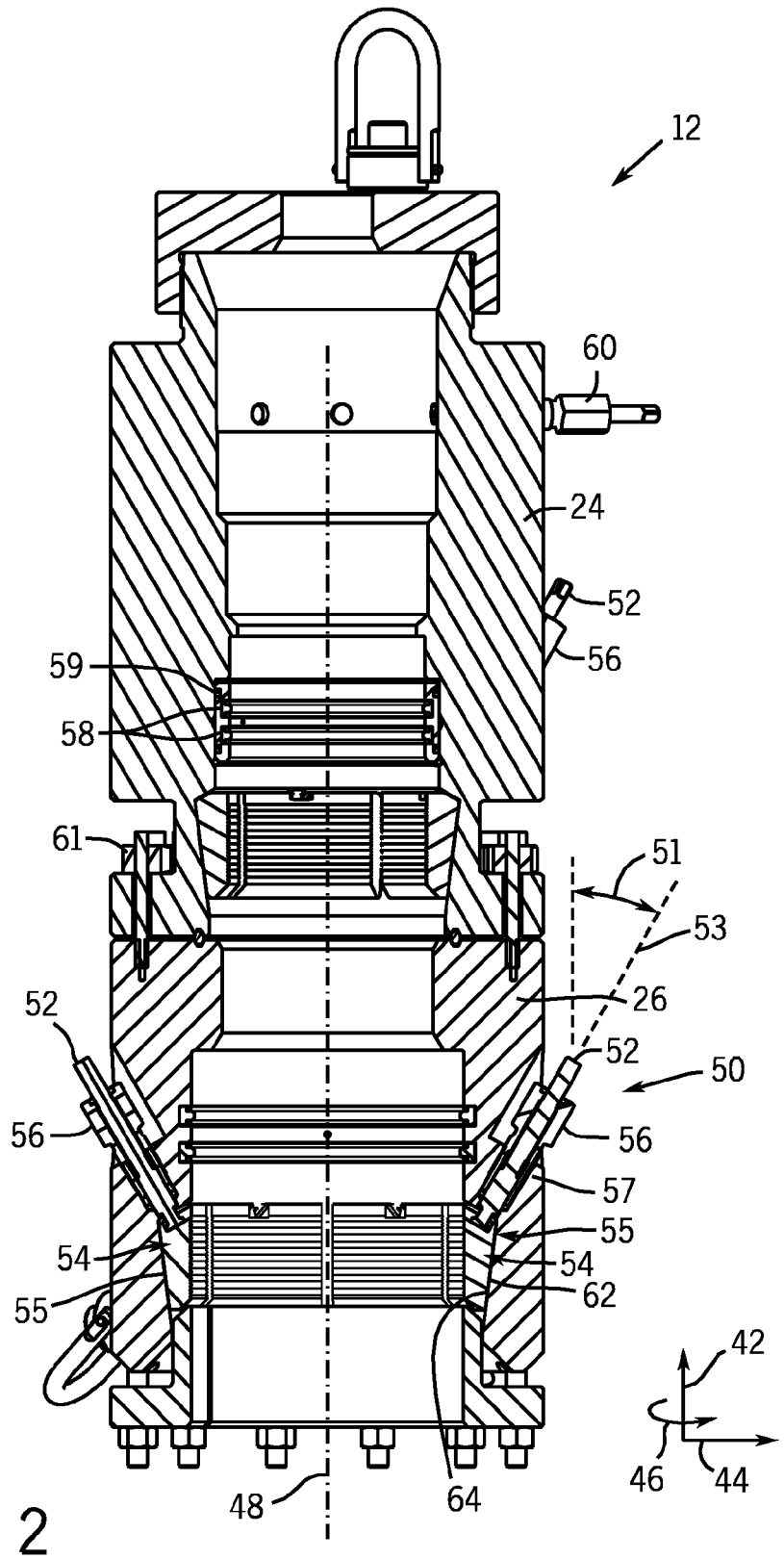
FIG. 2 is a cross-sectional side view of a portion of a wellhead including a tubular connector system, in accordance with an embodiment of the present techniques.

FIG. 2 depicts a cross-sectional side view of an embodiment of a wellhead 12 having a connector system 50 including an angled lockscrew 52 designed to mate with a locking segment 54 (e.g., tapered locking segment, substantially wedge-shaped locking segment) through a gland 56. In the illustrated embodiment, the locking segment 54 is disposed in a recess 55 (e.g., tapered recess), the gland 56 is disposed in an angled passage 57, and the lockscrew 52 is disposed in the gland 56. As discussed below, the lockscrew 52 is configured to move the locking segment 54 in and out of the recess 55 in response to angular movement of the lockscrew 52, thereby causing radial expansion and contraction of the locking segment 54.

In the following discussion, reference may be made to a longitudinal axis or axial direction 42, a radial axial or direction 44, and a circumferential axis or direction 46. As previously discussed with respect to FIG. 1, the wellhead 12 may include tubular members, such as the tubing spool 24 and the casing spool 26, disposed one over another along a longitudinal axis 48. One or more sealing assemblies, such as the seals 58, encompassed by the metal ring 59, may seal the tubing spool 24 and/or the casing spool 26 to a tubular member. Screws 60 may be inserted perpendicularly to the longitudinal axis 48 of the wellhead 12 (i.e., along radial axis 44) to join tubular members of the wellhead 12, and bolts 61 may be inserted parallel to the wellhead 12 (i.e., along axial axis 42) to join the tubing spool 24 and the casing spool 26, for example. However, connector methods such as the screws 60 and bolts 61 may each provide support only in one direction.

In one embodiment, the connector system 50 includes the locking segment 54 and the lockscrew 52 configured to join tubular members in the wellhead 12 with support in both the axial direction 42 and the radial direction 44. In particular, the lockscrew 52 is oriented at an acute angle 51 relative to the longitudinal axis 48 of the wellhead 12. Thus, the lockscrew 52 moves along an angled axis 53 inwardly and outwardly relative to the longitudinal axis 48. For example, the angle 51 of the angled axis 53 may be greater than 0 degrees and less than 90 degrees, e.g., approximately 5 to 60, 10 to 50, 20 to 40, or about 30 degrees. As discussed below, the angled movement of the lockscrew 52 along the angled axis 53 imparts axial and radial movement of the locking segment 54. In certain embodiments, each locking segment 54 may include a tapered surface 62 disposed along a mating tapered surface 64 of the respective recess 55, thereby enabling axial downward and upward movement and radial inward and outward movement of the locking segment 54 in response to the angled linear movement of the lockscrew 52 along the angled axis 53. Thus, as the locking segment 54 is moving axially and radially in the recess 55, it exerts axial force and radial force against a tubular member.

As will be further explained, the lockscrew 52 may have a boss 70 member at one end shaped to mate with a slot 72 in the locking segment 54. The lockscrew 52, the locking segment 54, and the gland 56 may first be positioned within a first tubular member (e.g., tubing spool 24 or casing spool 26) in an unlocked position. In the unlocked position, the locking segment 54 may be moved by the lockscrew 52 into a radially recessed position within the recess 57, such that the locking segment 54 does not protrude radially into the space inside the first tubular member in a manner interfering with movement of a second tubular member into the first tubular member. After positioning the second tubular member inside of the first tubular member (e.g., tubing spool 24 or casing spool 26), the lockscrew 52 may be rotated to drive the lockscrew 52 radially inward along the angled axis 53 toward the locking segment 54, thereby driving the locking segment 54 radially against the second tubular member. In particular, the radially inward movement of the lockscrew 52 causes axially downward movement of the locking segment 54, such that the tapered surface 62 of the locking segment 54 moves along the mating tapered surface 64 of the recess 55. In turn, the angled interface attributed to the tapered surfaces 62 and 64 causes radially inward movement of the locking segment 54, thereby causing the locking segment 54 to engage the second tubular member. During this movement, the boss 70 of the lockscrew 52 may rotate and/or slide partially along the slot 72 in locking segment 54, while also rotating within the gland 56. The locking segment 54 may be released in a similar manner, e.g., by rotating the lockscrew 52 in a reversed rotational direction to drive the lockscrew 52 radially outward along the angled axis 53, thereby pulling the locking segment 54 radially away from the second tubular member.

Figure 3:
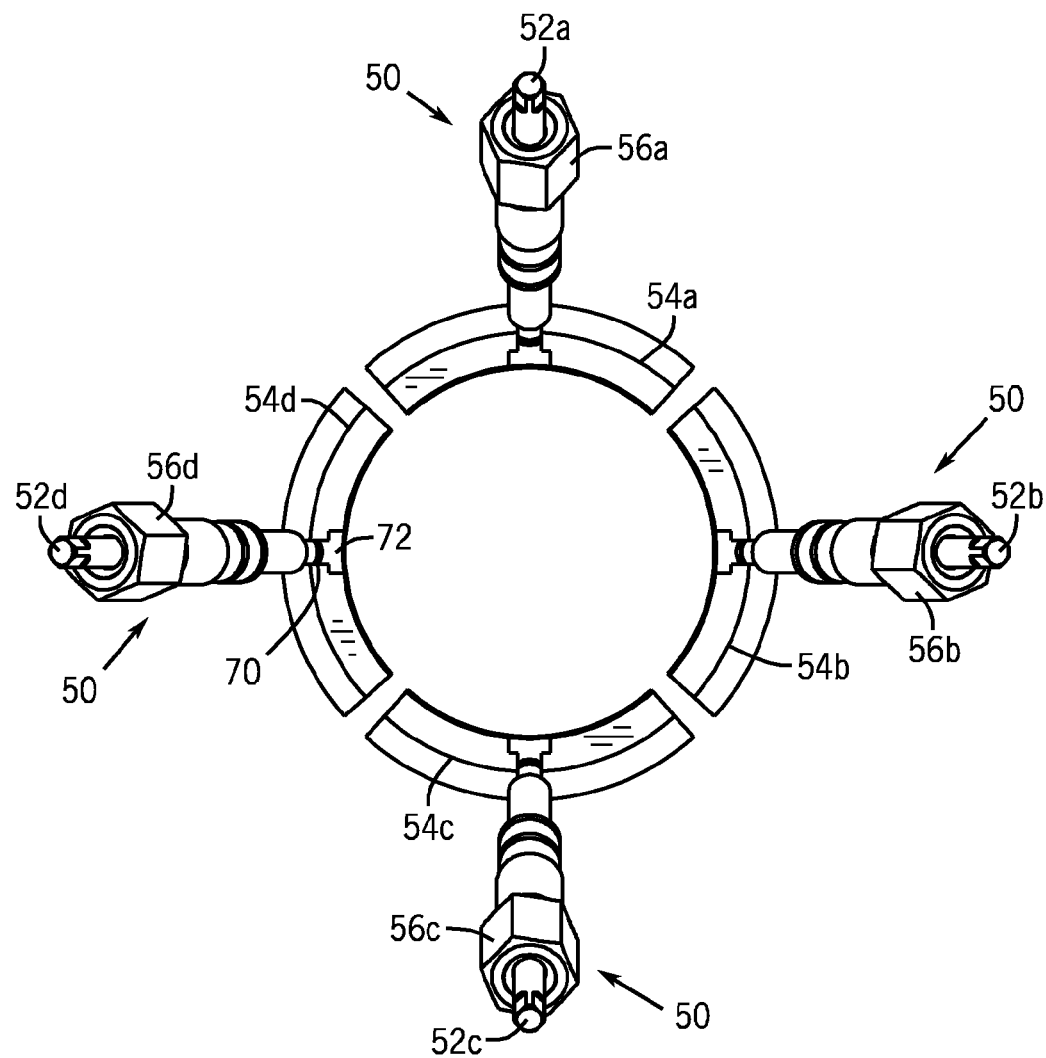
FIG. 3 is a top view of lockscrews in a tubular connector system, in accordance with an embodiment of the present techniques.

FIG. 3 is top view of the connector system 50 of FIG. 2 with the tubular members removed for clarity. The connector system 50 is arranged in a circular or annular arrangement, as employed between first and second tubular members (not shown). As appreciated, the connector system 50 may be employed between a variety of first and second tubular members. For example, the connector system 50 may be disposed in the tubing spool 24 and/or the casing spool 26 in the wellhead 12, such that the connector system 50 locks into place a tubular member. Further, while this particular connector system 50 may have four lockscrews 52a-52d, locking segments 54a-54d, and glands 56a-56d, the number of lockscrews 52 and locking segments 54 may depend on dimensions of the wellhead 12, such as the diameter of the tubular member supported by the connector system 50. For example, a tubular member having a diameter of approximately 10¾ inches may be supported by six each of the locking segments 54, lockscrews 52, and glands 56. A tubular member having a smaller diameter may be supported by less locking segments 54, lockscrews 52, and glands 56. However, any number of the locking segments 54, lockscrews 52, and glands 56 may be employed in various embodiments, e.g., 1 to 50, 2 to 10, or 10 to 20.

In some embodiments, the dimensions of the locking segments 54 and lockscrews 52 may also depend on the dimensions of the tubular members to be joined. For example, wider tubular members may be supported by wider locking segments 54 and/or wider or longer lockscrews 52. Some embodiments involve fitting only one lockscrew 52 for each locking segment 54, as illustrated in FIG. 3. However, in other embodiments, each locking segment 56 may have more than one slot 72 to mate with more than one lockscrew 52. The fitting of more than one lockscrew 52 for a locking segment 54 may also depend on the dimensions of the tubular member.

Figure 4:
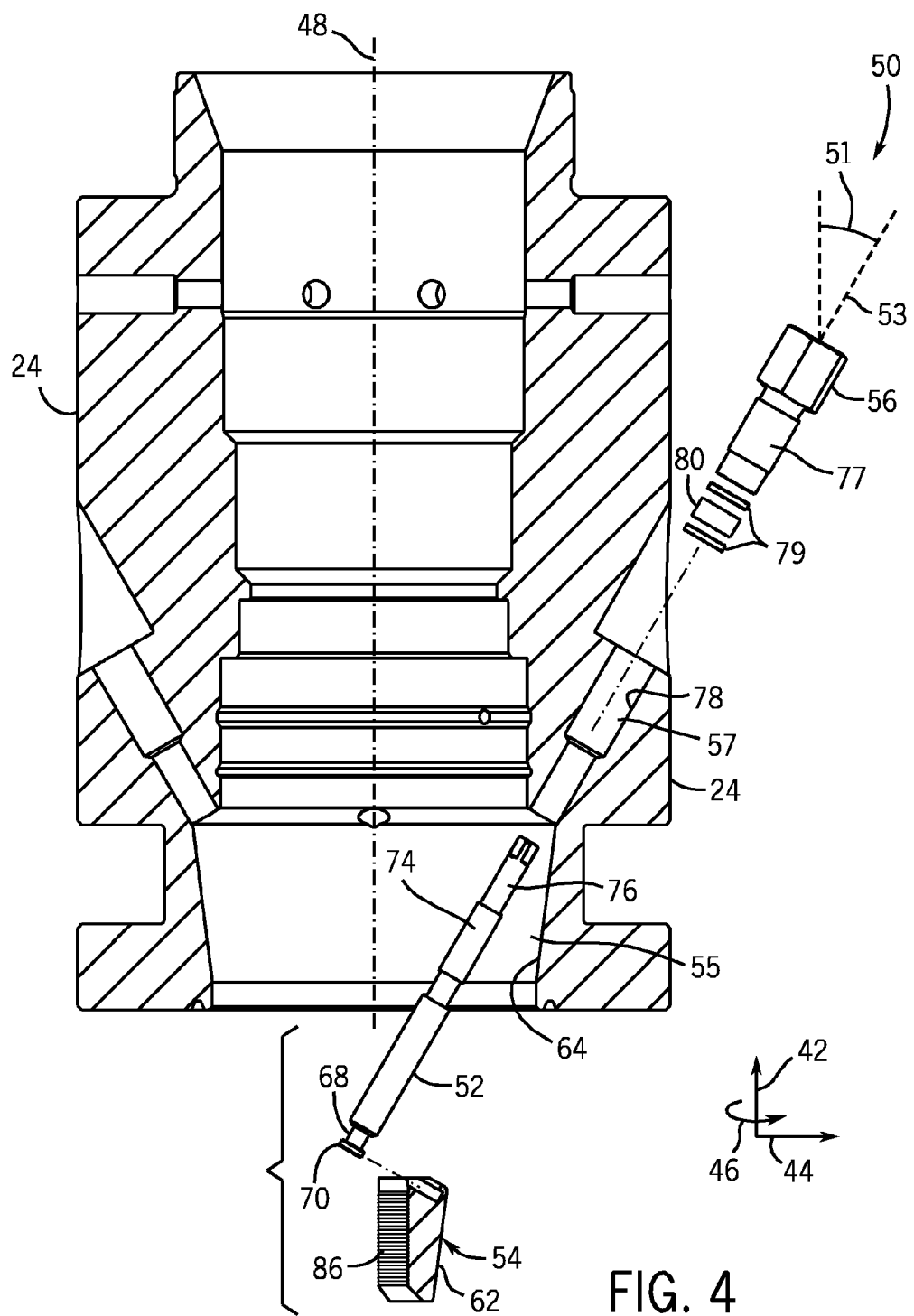
FIG. 4 is an exploded view of components of a tubular connector system, in accordance with an embodiment of the present techniques.

FIG. 4 is an exploded cross-sectional view of one embodiment of the connector system 50 and the tubing spool 24, illustrating an assembly process of the lockscrew 52, the locking segment 54, and the gland 56 relative to the passage 57 and the recess 55. For example, the gland 56 may be coupled to the passage 57 from the exterior of the tubing spool 24, e.g., by threading gland threads 77 into passage threads 78. In addition, a spacer 79 (e.g., annular metallic spacer) and a seal 80 (e.g., annular elastomer seal) may be disposed between the passage 57 and the gland 56 to provide sealing between the tubing spool 24, the lockscrew 52, and the gland 56. By further example, the lockscrew 52 and the locking segment 56 may be coupled together, and then inserted from an interior of the tubing spool 24. The lockscrew 52 may be inserted into the passage 57, and then threads 74 of the lockscrew 52 may be threaded into mating threads 73 inside the gland 56. As the lockscrew 52 threads into the gland 56, the locking segment 54 may be pulled into the recess 57. When the tubular connector system 50 is engaged (i.e., when the components are actuated such that the system is in a locked position), the lockscrew 52 may exert force along its axis 53. As the axis 53 of the lockscrew 52 is disposed at the angle 51 relative to the longitudinal axis 48 of the tubing spool 24, the lockscrew 52 may exert radial and axial forces (i.e., in directions 44 and 44) within the tubing spool 24 to push the locking segment 54 against the tubular member (not shown) surrounded by the tubing spool 24.

The lockscrew 52 may mate with the locking segment 54 via an interconnection between the boss 70 of the lockscrew 52 and the slot 72 of the locking segment 56. The boss 70 of the lockscrew 52 may be an end portion that is similar to a disk shape, and wider in diameter than the portion of the lockscrew 52 immediately adjacent to the boss 70. For example, as depicted, the lockscrew 52 in some embodiments may have a recess (e.g., an annular groove) 68 adjacent the wider boss 70.

Figure 5:
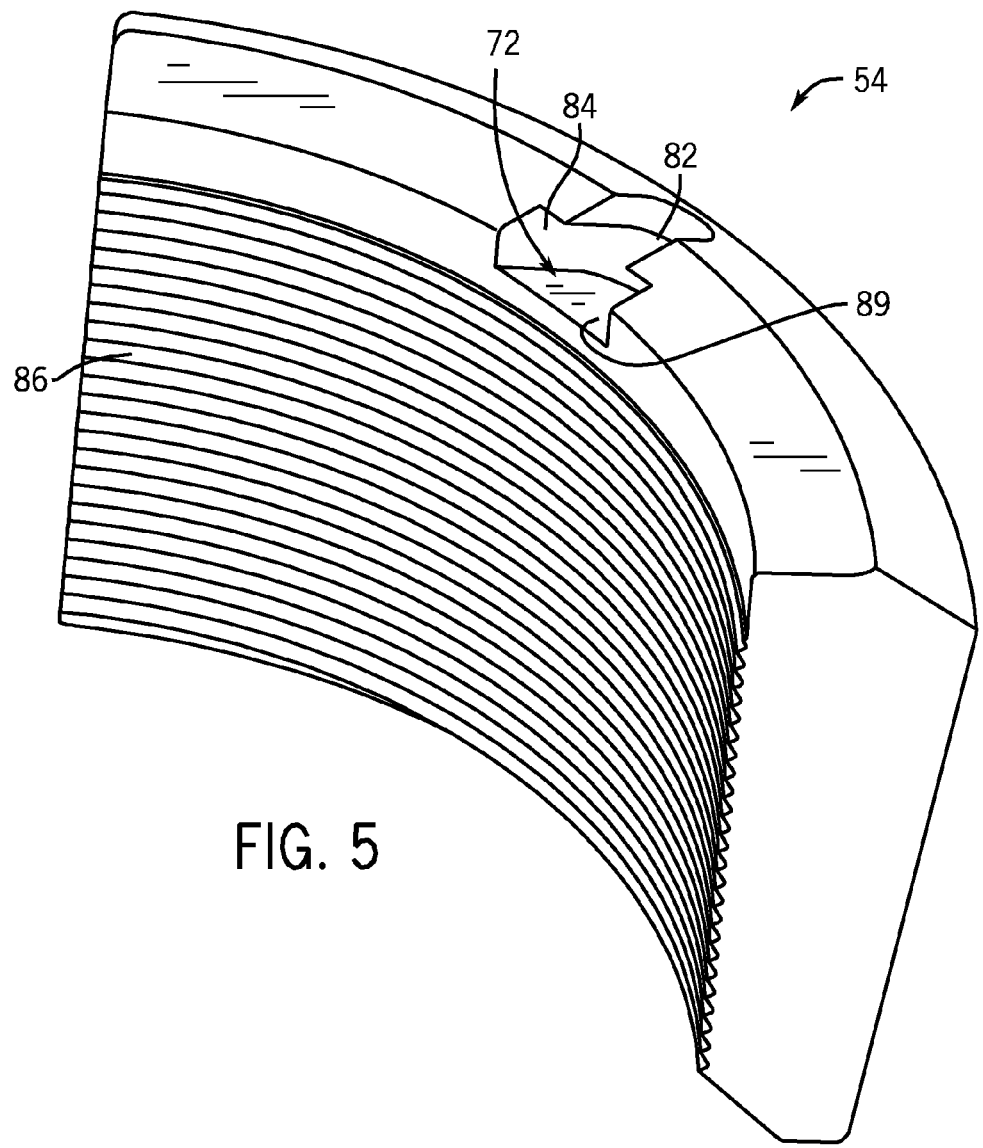
FIG. 5 is a perspective view of a locking segment, in accordance with an embodiment of the present techniques.

The slot 72 of the locking segment 54 may be better explained in the more detailed illustration of the perspective view of the locking segment 54 in FIG. 5. In one embodiment, the slot 72 may have a narrow portion 82 and a wide portion 84. As appreciated, the boss 70 fits within the wide portion 84, while the annular groove 68 fits within the narrow portion 82. In this manner, the slot 72 blocks movement of the boss 70 (and thus the lockscrew 52) along the angled axis 53 of the lockscrew 52. Thus, as the lockscrew 52 moves along the angled axis 53, the interlocking between the boss 70 and the slot 72 causes the locking segment 54 to move upward and downward. As appreciated, movement of the lockscrew 52 includes both axial and rotational movement, and thus the lockscrew 52 may rotate and slide the boss 70 along the slot 72. The illustrated slot 72 has an angled bottom surface 89, which may be approximately 90 degrees (i.e., perpendicular) relative to the angled axis 53 of the lockscrew 52. Thus, the boss 70 may slide in a radially inward direction along the angle of the angled bottom surface, and approximately perpendicular to the angled axis 53 of the lockscrew 52.

As further illustrated in FIG. 5, the locking segment 54 may have teeth 86 along an interior circumference of the locking segment 54. The teeth 86 may be suitable for securing contact with a tubular member disposed inside of the tubing spool 24, such that the locking segment 54 may be firmly held against the tubular member when the connector system 50 (including the lockscrew 52, the locking segment 54, and the gland 56) is engaged (i.e., locked). In some embodiments, the locking segment 54 may also have teeth along an exterior circumference of the locking segment 54, which may aid in retaining the locking segment 54 within the space in the tubing spool 24.

Referring back to the exploded view of the tubular connector system and the tubing spool 24 in FIG. 4, the connector system 50 may also include the gland 56 which may function to tighten against the lockscrew 52. As discussed below, the tightening of the gland (e.g., via a mechanical force) may exert pressure on the lockscrew 52, which may cause the lockscrew 52 to be pushed along the axis 53 of the lockscrew 52. The extension of the lockscrew 52 may cause the locking segment 54 to be pushed against the tubular member, as discussed. The gland 56 may fit over an outer end 76 of the lockscrew 52, and may be sealed to the lockscrew 52 by the seal 80. The spacer 79 may provide relief for the lockscrew 52 within the lockscrew space 78 when the gland 56 tightens to shift the lockscrew 52 into a locked position.

A sequence of actuating the tubular connector system from a first position (e.g., unlocked position) into a second position (e.g., locked position) is depicted in FIGS. 6-10. In particular, FIGS. 6-10 illustrate the lockscrew 52, the locking segment 54, and the gland 56 positioned in the tubing spool 24, as well as detailed illustrations of the interface between the lockscrew 52 and the locking segment 54, and the movement of the locking segment 54 relative to a tubular member. While FIGS. 6-10 depict the connector system in the tubing spool 24, the tubular connector system 50 may be implemented to connect any tubular members in a mineral extraction system 10 in accordance with embodiments of the present techniques.

Figure 6:
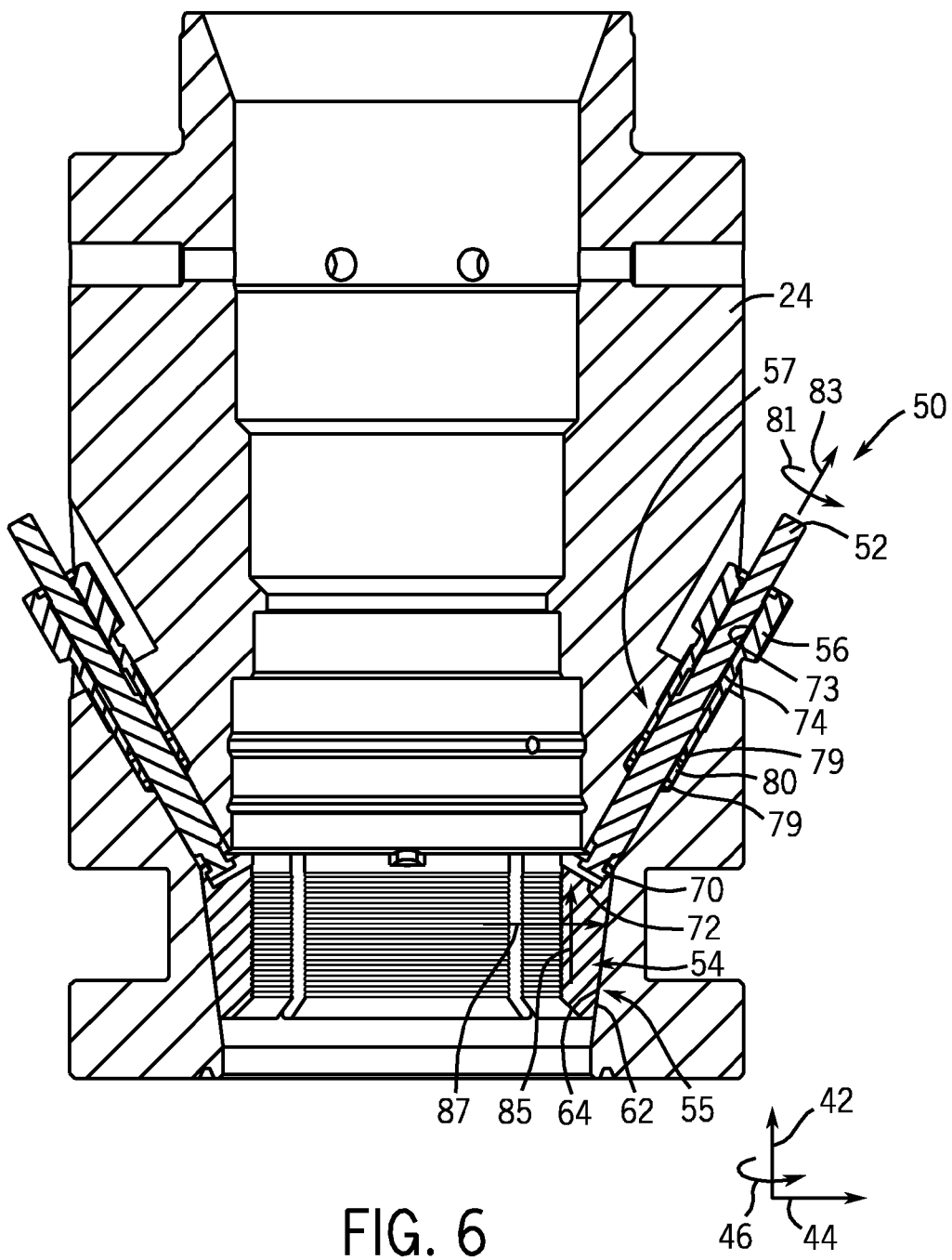
FIG. 6 is cross-sectional side view of a lockscrew positioned in a locking segment and tubing spool in accordance with an embodiment of the present techniques.

The cross-sectional side view of the tubing spool 24 and one embodiment of the tubular connector system 50 is illustrated in FIG. 6. The connector system 50 is not yet engaged, and the tubing spool 24 has not yet been installed over a tubular member in the wellhead 12 (as in FIG. 1). In particular, the lockscrew 52 may be rotated in a first rotational direction 81 about the angled axis 53 to cause movement of the lockscrew 52 in a first linear direction 83 radially outward from the tubing spool 24 and the longitudinal axis 48. In turn, the movement of the lockscrew 52 in the first linear direction 83 causes the locking segment 54 to move in a first axial direction 85 (e.g., upward axial direction), thereby causing the tapered surface 62 of the locking segment 54 to slide along the tapered surface 64 of the recess 55. The upward movement of the locking segment 54 in the first axial direction 85 and the sliding movement between these tapered surfaces 62 and 64 causes locking segment 54 to move in a first radial direction 87 (e.g., an outward radial direction) further recessing the locking segment 54 into the recess 55. In this manner, the locking segment 54 is moved into the recess 55 while still being retained to the locking screw 52, such that the locking segment 54 does not interfere with installation of a tubular member into the tubing spool 24. In some embodiments, the lockscrew 52, the locking segment 54, and the gland 56 may be installed in a tubular member, such as the tubing spool 24, in advance. For example, the tubing spool 24 may be manufactured to have the connector system 50 in accordance with the present techniques, and the connector system may be used for connections or installations between the tubing spool 24 and various casings or tubing.

In other embodiments, the lockscrew 52, the locking segment 54, and/or the gland 56 may be separate components, and may be installed into the tubing spool 24 or any other tubular member when a connection is to be made. Due to the design of the tubular connector system 50, installation or connection between tubular members may not require additional tools or parts, such as additional screws or pins. For example, and as discussed with respect to FIG. 5, the boss 70 of the lockscrew 52 may be positioned into the slot 72 to axially hold the locking segment 54 relative to the lockscrew 52 in both locked and unlocked positions of the connector system 50 relative to a tubular member.

The installation of the connector system 50 in the tubing spool 24 may also be simplified due to the configuration of the locking segment 54 and the lockscrew 52. In particular, the interconnection between the lockscrew 52 and the locking segment 54 may enable preloading of the connector system. For example, the lockscrew 52 may be fitted with the locking segment 54 and the gland 56 to be preloaded in the tubing spool 24, as the interconnection between the boss 70 and the slot 72 may retain the locking segment 54 in the tubing spool 24. Furthermore, in some embodiments, only one lockscrew 52 is mated with each locking segment 54. Employing one lockscrew 52 for one locking segment 54 may simplify installation of the tubing spool 24 over a casing or tubular member, and may reduce installation time, which may be beneficial for subsea installations. In deep water use, a simplified installation process may also enable installations using a remotely operated underwater vehicle. Thus, installations involving the connector system 50 of the present techniques may be performed sub-sea with greater flexibility.

Figure 7:
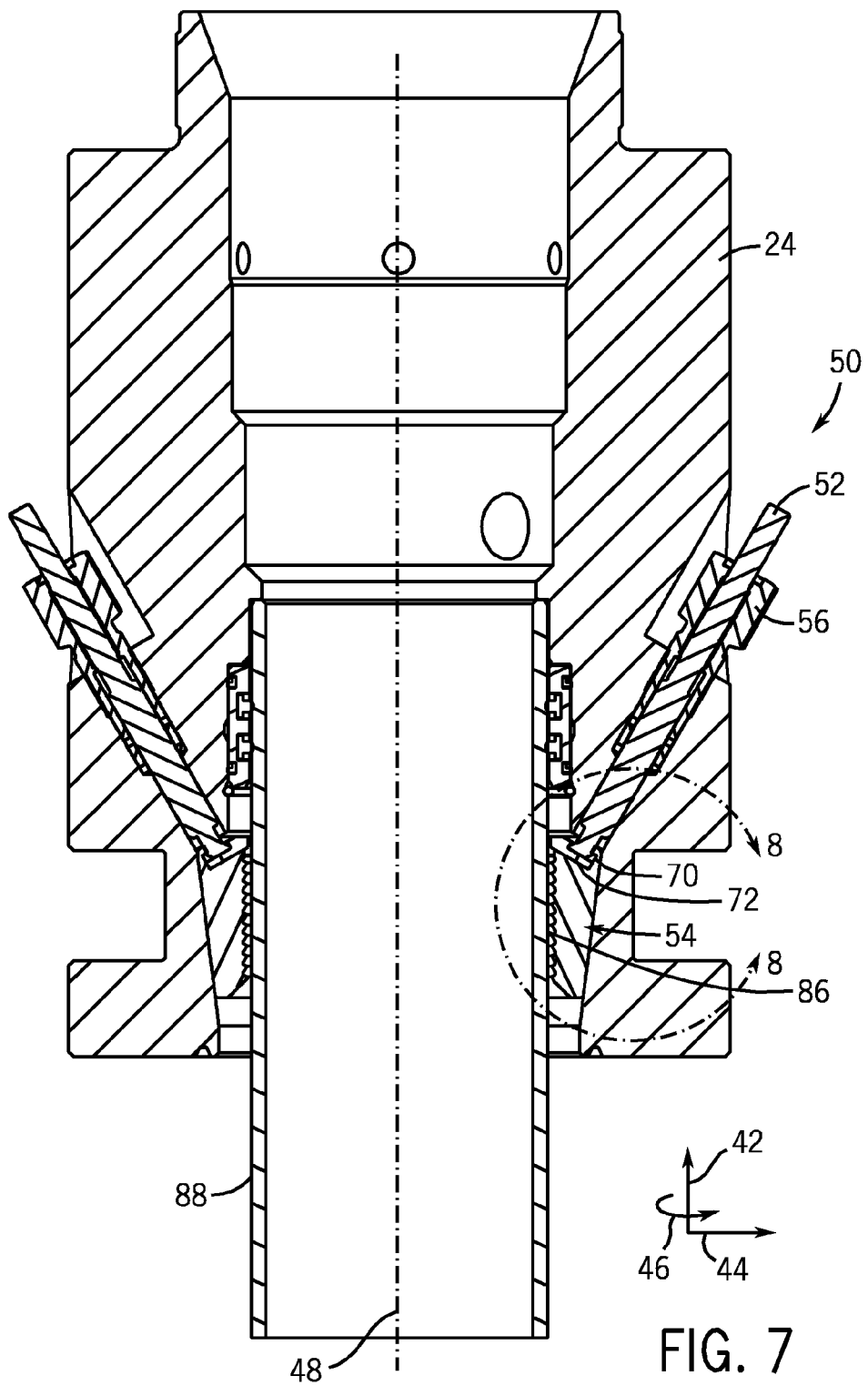
FIG. 7 is a cross-sectional side view of a locking segment and a lockscrew in a first position (e.g., unlocked position) in a tubing spool positioned over a casing, in accordance with an embodiment of the present techniques.

Once the components of the tubular connector system 50 are in position in the tubing spool 24, the tubing spool 24 may be installed over a casing or tubular member 88, as illustrated in FIG. 7. As illustrated, the tubular connector system 50 may still be unlocked (e.g., locking segment 54 is axially raised and radially recessed into the recess 55), and the gland 56 may not yet be tightened about the lockscrew 52. Further, the teeth 86 of the locking segment 54 are radially retracted away from the tubular member 88, such that the teeth 86 do not secure the tubular member 88 relative to the tubing spool 24.

Figure 8:
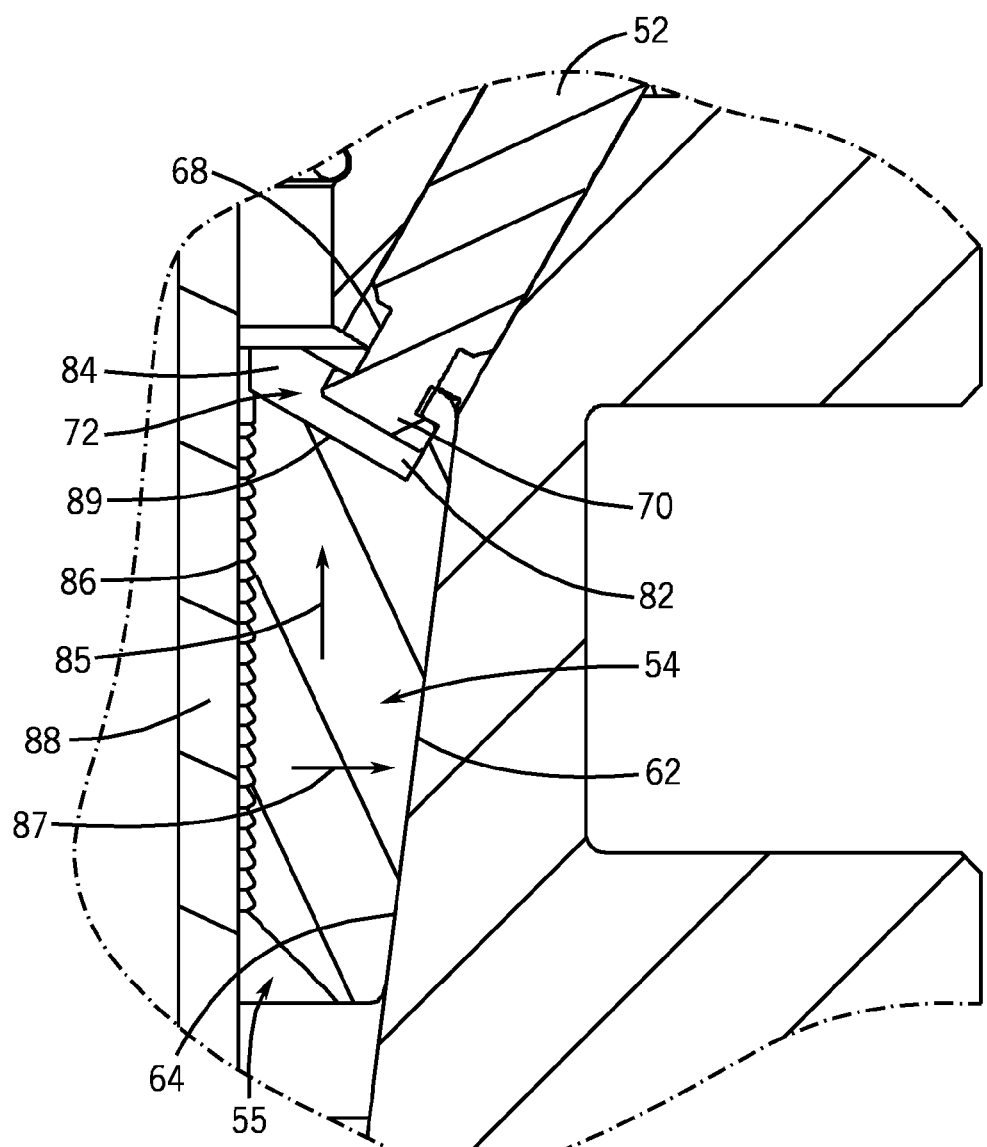
FIG. 8 is a partial cross-sectional side view taken within arcuate line 8-8 of FIG. 7, illustrating the first position (e.g., unlocked position) of the locking segment and the lockscrew.

A detailed illustration of the positions of the lockscrew 52 and the locking segment 54 in an unlocked position once the tubing spool 24 is installed over a casing or tubular member 88 is provided in FIG. 8. The cross-sectional side view of FIG. 8 is taken within arcuate line 8-8 of FIG. 7. As discussed above, the annular groove 68 of the lockscrew 52 is fit into the narrow portion 82 of the slot 72 in the locking segment 54, while the boss 70 is fit into the wide portion 84 of the slot 72 in the locking segment 54. Due to the greater diameter of the boss 70 relative to the annular groove 68, the lockscrew 52 is retained to the locking segment 54 when the lockscrew 52 is moved in the first linear direction 83, or axially upward and radially outward from the tubing spool 24. The movement of the lockscrew 52 also moves the locking segment 54 in the first axially upward direction 85 and radially outward direction 87. This movement causes the tapered surface 62 of the locking segment 54 to slide upward and outward along the tapered surface 64 of the recess 55. Thus, the locking segment 54 is moved into the recess 55 when in the unlocked position. In the unlocked position, the locking segment 54 does not exert force against a tubular member (such as the tubular member 88) over which the tubing spool 24 is installed. As illustrated by the gap between the teeth 86 of the locking segment 54 and the tubular member 88, the locking segment 54 may not be in substantial contact with the tubular member 88 in the unlocked position.

Figure 9:
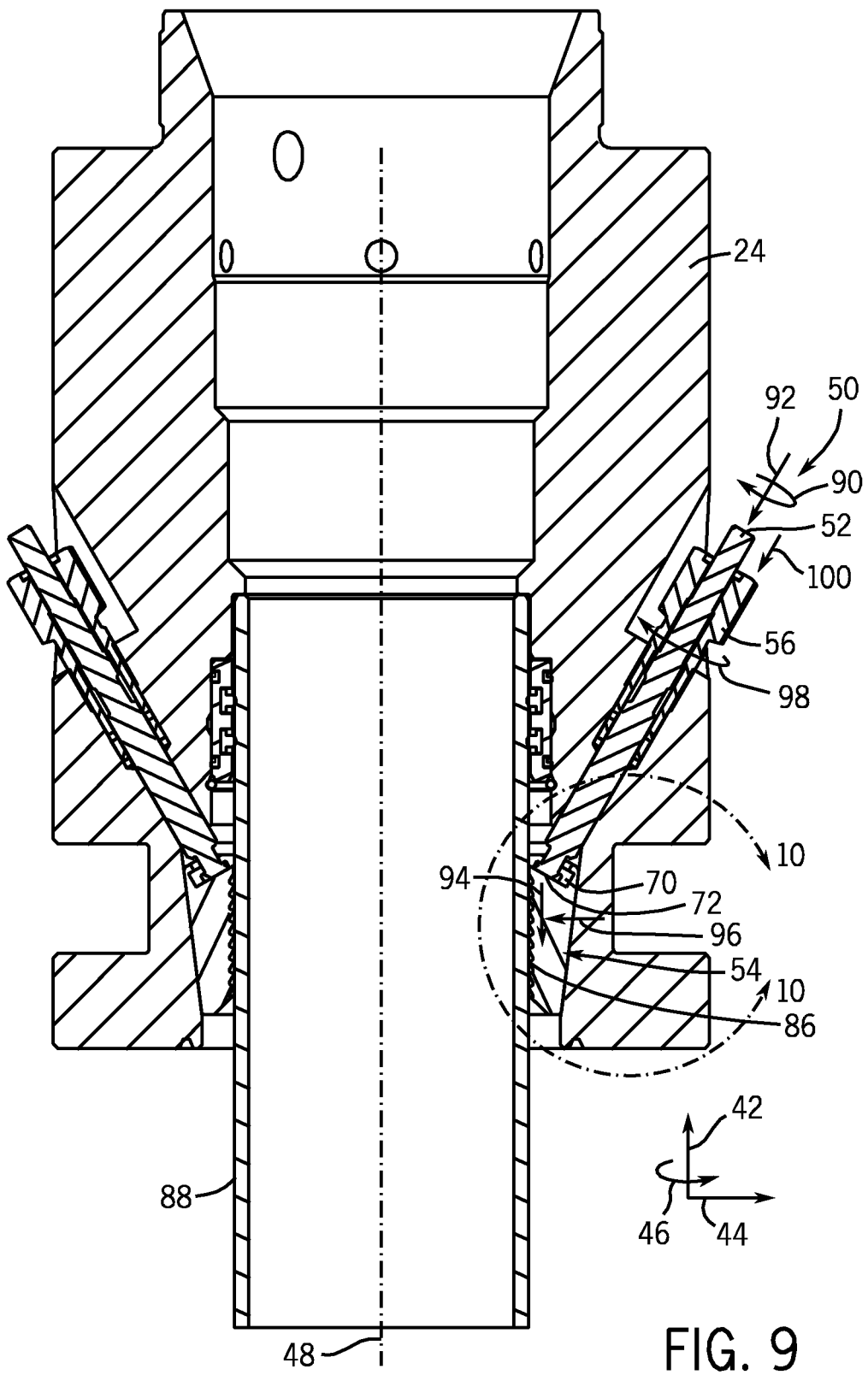
FIG. 9 is a cross-sectional side view of a locking segment and a lockscrew in a second position (e.g., locked position) in a tubing spool positioned over a casing, in accordance with an embodiment of the present techniques.

A cross-sectional side view of a final locked position of the tubular connector system 50 implemented on the tubing spool 24 and the tubular member 88 is illustrated in FIG. 9. The locked position of the system 50 may have been actuated by tightening the lock screw 52 and the gland 56. In one embodiment, the lockscrew 52 and the gland 56 may be tightened mechanically. However, in other embodiments, the tightening of the gland, and thus the actuating of the tubular connector system 50 into a locked position, may use hydraulic, air, or electric power, or some combination of these powers.

In particular, the lockscrew 52 may be rotated in a second rotational direction 90 about the angled axis 53 to cause movement of the lockscrew 52 in a second linear direction 92 radially inward into the tubing spool 24 toward the longitudinal axis 48. In turn, the movement of the lockscrew 52 in the second linear direction 92 causes the locking segment 54 to move in a second axial direction 94 (e.g., downward axial direction), thereby causing the tapered surface 62 of the locking segment 54 to slide along the tapered surface 64 of the recess 55. The downward movement of the locking segment 54 in the second axial direction 94 and the sliding movement between these tapered surfaces 62 and 64 causes locking segment 54 to move in a second radial direction 96 (e.g., an inward radial direction) causing protrusion of the locking segment 54 away from the recess 55 against the tubular member 88. In this manner, the locking segment 54 creates a radial force against the tubular member 88, along with the retention provided by the teeth 86, while still being retained to the locking screw 52.

Figure 10:
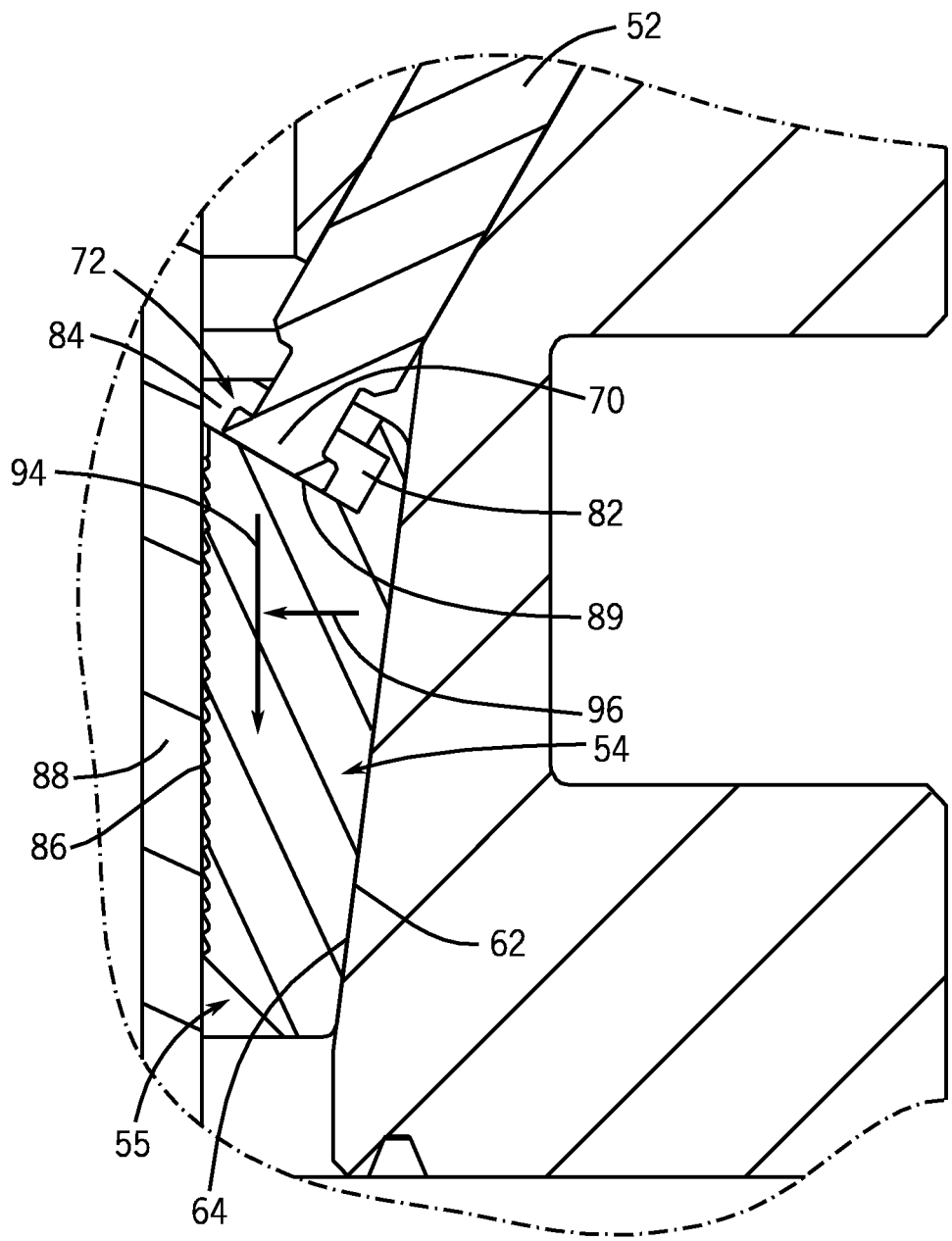
FIG. 10 is a partial cross-sectional side view taken within arcuate line 10-10 of FIG. 9, illustrating the second position (e.g., locked position) of the locking segment and the lockscrew.

A detailed illustration of the lockscrew 52 and the locking segment 54 in a locked position is provided in FIG. 10, which is a partial cross-sectional side view taken within arcuate line 10-10 of FIG. 9. As the lockscrew 52 rotates and moves in a downward and radially inward direction toward the longitudinal axis 48, the boss 70 of the lockscrew 52 moves along the slot 72 of the locking segment 54 to impart a downward and radially inward force against the locking segment 54. As a result of this interface between the boss 70 of the lockscrew 52 and the slot 72 of the locking segment 54, the movement of the lockscrew 52 also moves the locking segment 54 in the second axially downward direction 94 and radially inward direction 96. This movement causes the tapered surface 62 of the locking segment 54 to slide downward and inward along the tapered surface 64 of the recess 55. Thus, the locking segment 54 is moved downward in the recess 55 when in the locked position. As indicated by the contact between the teeth 86 of the locking segment 54 and the tubular member 88, the locking segment 54 exerts a radially inward force against the tubular member 88, thus locking the tubular member 88 relative to the tubing spool 24 when in the locked position.

After the lockscrew 52 pushes the locking segment 54 against the tubular member 88, the gland 56 may be rotated in a rotational direction 98 to cause linear movement in a linear direction 100 (e.g., radially inward) toward the longitudinal axis 48. In this manner, the inward movement of the gland 56 may cause axial compression of seal 80 and spacer 79 between the gland 56 and the passage 57. The axial compression of the seal 80 causes the seal to expand radially against both the passage 57 and the lockscrew 52, thereby providing a tight seal between the tubing spool 24, the lockscrew 52, and the gland 56.

Again, the angle 51 of the lockscrew 52 may also affect the connection of the tubular member 88. As discussed above, the angle 51 of the lockscrew 52 relative to the axis 48 of the tubing spool 24 and/or any other tubular members of the mineral extraction system 10 may lock the tubular member 88 with both radial force and axial force. For example, a typical screw which is positioned perpendicularly to the axis 48 of the tubing spool 24 may apply only radial force (i.e., force perpendicular to the axis 48 of the tubing spool 24). In contrast, the angled lockscrew 52 provides both axial and radial forces, while also simplifying the connection with tools in a subsea environment.

In one embodiment, the lockscrew 52 may have an angle 51 of approximately 30 degrees relative to the axis 48 of the tubular member 88. In some embodiments, the angle 51 of the lockscrew 52 may range from 20 to 40 degrees relative to the axis 48 of the tubular member 88. In other embodiments, the angle 51 of the lockscrew 52 relative to the tubular member 88 is small enough for the lockscrew 52 to move the locking segment 54 without substantial resistance between an unlocked position and a locked position (e.g., up and down), while the angle 51 is also large enough such that the gland 56 and/or the outer end 76 of the lockscrew 52 is accessible for actuating the tubular connector system between locked and unlocked positions.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a locking segment having a slot that is acutely angled in a first direction relative to an axis of a tubular member in a wellhead, wherein the slot is configured to receive an end portion of a lock screw to enable rotation of the lock screw along a rotational axis that is acutely angled in a second direction relative to the axis of the tubular member, the first and second directions are crosswise to one another, the slot is configured to enable movement of the end portion of the lock screw in the first direction along the slot between first and second positions, the slot is configured to release the end portion of the lock screw from the locking segment at the first position along the slot, and the slot is configured to couple the end portion of the lock screw to the locking segment at the second position along the slot.

2. The system of claim 1, wherein the slot of the locking segment comprises a narrow slot portion adjacent a wide slot portion both extending in the first direction to the second position, and the slot comprises a screw release opening at the first position along the slot.

3. The system of claim 2, wherein the narrow and wide slot portions extend in the first direction from a first curved surface toward a second curved surface, and the first and second curved surfaces are on opposite sides of the locking segment.

4. The system of claim 3, wherein the first curved surface comprises teeth.

5. The system of claim 3, wherein the first and second curved surfaces are tapered relative to one another.

6. The system of claim 3, wherein the narrow and wide slot portions are open to the first curved surface and closed to the second curved surface.

7. The system of claim 6, wherein the first curved surface has a smaller radius than the second curved surface.

8. The system of claim 7, wherein the narrow and wide slot portions define a T-shaped cross-section that extends in the first direction to the second position.

9. The system of claim 8, comprising the lock screw having the end portion disposed in the T-shaped cross-section of the slot.

10. The system of claim 2, wherein the narrow and wide slot portions define a T-shaped cross-section that extends in the first direction to the second position.

11. The system of claim 1, comprising the locking segment and the tubular member of the wellhead, wherein the end portion of the lock screw is disposed in the slot.

12. The system of claim 1, wherein the slot extends in the first direction substantially perpendicular relative to the rotational axis of the lock screw.

13. The system of claim 1, wherein the locking segment is substantially wedge shaped.

14. The system of claim 1, wherein a radially inward face of the locking segment comprises teeth, and the slot is acutely angled relative to the radially inward face.

15. The system of claim 1, comprising a plurality of the locking segments configured to mount in an annular arrangement, wherein each locking segment has the slot configured to receive the end portion of a respective lock screw.

16. The system of claim 1, wherein the slot extends along an inner radius of the locking segment.

17. The system of claim 1, wherein the slot extends along a first axial end of the locking segment in the first direction that is acutely angled relative to the axis of the tubular member, and the slot is configured to enable movement of the end portion of the lock screw in the first direction along the slot in the first axial end.

18. The system of claim 1, comprising the lock screw having the end portion disposed in the slot, wherein the lock screw is configured to rotate to cause movement of the end portion along the slot in the first direction that is acutely angled relative to the axis to bias the locking segment.

19. A system, comprising:
a locking assembly, comprising:
a first locking segment; and
a second locking segment, wherein the first and second locking segments are circumferentially offset from one another about an axis;
wherein the first locking segment has a first slot extending lengthwise a first distance in a first direction away from the axis at a first acute angle relative to the axis, wherein the first slot is configured to receive a first end portion of a first threaded member to enable rotation of the first threaded member along a first rotational axis that is acutely angled relative to the axis, and the first slot is configured to enable movement of the first end portion of the first threaded member in the first direction along the first slot crosswise to the first rotational axis; and
wherein the second locking segment has a second slot extending lengthwise a second distance in a second direction away from the axis at a second acute angle relative to the axis, wherein the second slot is configured to receive a second end portion of a second threaded member to enable rotation of the second threaded member along a second rotational axis that is acutely angled relative to the axis, and the second slot is configured to enable movement of the second end portion of the second threaded member in the second direction along the second slot crosswise to the second rotational axis.

20. The system of claim 19, comprising:
a third locking segment having a third slot extending lengthwise a third distance in a third direction away from the axis at a third acute angle relative to the axis, wherein the third slot is configured to receive a third end portion of a third threaded member to enable rotation of the third threaded member along a third rotational axis that is acutely angled relative to the axis, and the third slot is configured to enable movement of the third end portion of the third threaded member in the third direction along the third slot crosswise to the third rotational axis;
wherein the first, second, and third locking segments are circumferentially offset from one another about the axis.

21. The system of claim 20, comprising:
a fourth locking segment having a fourth slot extending lengthwise a fourth distance in a fourth direction away from the axis at a fourth acute angle relative to the axis, wherein the fourth slot is configured to receive a fourth end portion of a fourth threaded member to enable rotation of the fourth threaded member along a fourth rotational axis that is acutely angled relative to the axis, and the fourth slot is configured to enable movement of the fourth end portion of the fourth threaded member in the fourth direction along the fourth slot crosswise to the fourth rotational axis;

wherein the first, second, third, and fourth locking segments are circumferentially offset from one another about the axis.

22. A system, comprising:
a locking segment configured to mount in a wellhead, wherein the locking segment comprises:
a body having a first curved surface opposite from a second curved surface and a first end surface opposite from a second end surface, wherein the first and second end surfaces extend between the first and second curved surfaces;
a slot disposed in the body, wherein the slot has a T-shaped cross-section that extends a distance in a first direction from the first curved surface toward the second curved surface, wherein the slot is open to the first curved surface, the slot is open to the first end surface, and the slot extends lengthwise in the first direction at an acute angle relative to the first curved surface, the second curved surface, an axis of the wellhead, or a combination thereof.

23. The system of claim 22, wherein the first curved surface has a smaller radius than the second curved surface, the first curved surface comprises teeth, the first and second curved surfaces are tapered relative to one another, and the slot is closed relative to the second curved surface and the second end surface.

24. The system of claim 22, wherein the first curved surface has a smaller radius than the second curved surface.

25. A system, comprising:
a first tubular having a first bore with a first shoulder between opposite axial ends of the first bore, wherein the first tubular is configured to surround a second tubular with an axial end of the second tubular axially abutting against the first shoulder between the opposite axial ends of the first tubular, and the first shoulder is configured to block the second tubular from extending through the first tubular; and
a locking assembly, comprising:
a locking segment disposed within the first tubular, wherein the locking segment is configured to be positioned radially between the first tubular and the second tubular; and
a lock screw extending through the first tubular to the locking segment, wherein a rotational axis of the lock screw is oriented at a first acute angle relative to a first longitudinal axis of the first tubular.

26. The system of claim 25, comprising the second tubular disposed within the first tubular, wherein the axial end of the second tubular axially abuts against the first shoulder between the opposite axial ends of the first tubular, the first shoulder blocks the second tubular from extending through the first tubular, the locking segment is disposed radially between the first tubular and the second tubular, and the lock screw biases the locking segment against the second tubular to lock the first tubular to the second tubular.

27. The system of claim 25, wherein the lock screw is configured to actuate the locking segment to lock the first tubular to the second tubular without any threaded fasteners between the first tubular and the second tubular.

28. The system of claim 25, wherein the locking assembly is configured to lock the first tubular to the second tubular of a wellhead assembly, the locking segment has a first tapered surface disposed along a second tapered surface of the first bore of the first tubular at a second acute angle relative to the first longitudinal axis of the first tubular, and the second acute angle is less than the first acute angle of the rotational axis of the lock screw relative to the first longitudinal axis of the first tubular.

29. The system of claim 28, wherein the lock screw is coupled to the locking segment without any additional fasteners, and the first acute angle is less than 40 degrees.

30. The system of claim 25, wherein the lock screw comprises a head interlocked with a T-shaped slot in the locking segment, and the T-shaped slot extends crosswise to the rotational axis of the lock screw at a second acute angle relative to the first longitudinal axis of the first tubular.

31. The system of claim 25, comprising a second shoulder between opposite axial ends of the first bore and a seal disposed in the first bore adjacent the second shoulder, wherein the seal is configured to surround the second tubular while the second tubular is axially abutting against the first shoulder, wherein each of the first and second shoulders comprises an annular shoulder extending radially inward toward the first longitudinal axis of the first tubular.

32. The system of claim 25, wherein the locking segment is a one-piece structure having a first non-threaded coupling, the lock screw has a second non-threaded coupling, the first and second non-threaded couplings interlock the lock screw with the locking segment, the first and second non-threaded couplings enable rotation of the lock screw relative to the locking segment, and the first and second non-threaded couplings enable lateral movement of the lock screw relative to the locking segment in a lateral direction perpendicular to the rotational axis of the lock screw.

* * * * *